(12) United States Patent
Lau et al.

(10) Patent No.: US 11,929,494 B2
(45) Date of Patent: Mar. 12, 2024

(54) ANODE ACTIVE MATERIAL INCLUDING LOW-DEFECT TURBOSTRATIC CARBON

(71) Applicant: NANOGRAF CORPORATION, Chicago, IL (US)

(72) Inventors: Joshua J. Lau, Chicago, IL (US); Aaron Yost, Evanston, IL (US); James McKinney, Chicago, IL (US); Cary Michael Hayner, Chicago, IL (US); Jack Cavanaugh, Chicago, IL (US); Seonbaek Ha, Evanston, IL (US)

(73) Assignee: NANOGRAF CORPORATION, Chicago, IL (US)

( * ) Notice: Subject to any disclaimer, the term of this patent is extended or adjusted under 35 U.S.C. 154(b) by 0 days.

(21) Appl. No.: 18/152,444

(22) Filed: Jan. 10, 2023

(65) Prior Publication Data
US 2023/0163278 A1 May 25, 2023

Related U.S. Application Data

(62) Division of application No. 16/876,915, filed on May 18, 2020, now Pat. No. 11,588,150.
(Continued)

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0402* (2013.01); *H01M 4/386* (2013.01);
(Continued)

(58) Field of Classification Search
CPC .... H01M 10/04; H01M 10/0525; H01M 4/36; H01M 4/62; H01M 4/48; H01M 4/04
See application file for complete search history.

(56) References Cited

U.S. PATENT DOCUMENTS 5,096,685 A  3/1992  Funahashi et al.
5,502,010 A  3/1996  Nadahara et al.
(Continued)

FOREIGN PATENT DOCUMENTS

CA  106030871 A  10/2016
CA  106992292 A   7/2017
(Continued)

OTHER PUBLICATIONS

Habibi, A. et al., "Fast Synthesis of Turbostratic Carbon Thin Coating by Cathodic Plasma Electrolysis", Thin Solid Films, vol. 621, pp. 253-258, (2017).
(Continued)

*Primary Examiner* — Kenneth J Douyette
(74) *Attorney, Agent, or Firm* — THE MARBURY LAW GROUP PLLC (57) ABSTRACT

An electrode material for a lithium ion secondary battery and method of forming the same, the electrode material including composite particles, each composite particle including: a primary particle including an electrochemically active material; and an envelope disposed on the surface of the primary particle. The envelope includes turbostratic carbon having a Raman spectrum having: a D band having a peak intensity ($I_D$) at wave number between 1330 $cm^{-1}$ and 1360 $cm^{-1}$; a G band having a peak intensity ($I_G$) at wave number between 1530 $cm^{-1}$ and 1580 $cm^{-1}$; and a 2D band having a peak intensity ($I_{2D}$) at wave number between 2650 $cm^{-1}$ and 2750 $cm^{-1}$. In one embodiment, a ratio of $I_D/I_G$ ranges from greater than zero to about 1.1, and a ratio of $I_{2D}/I_G$ ranges from about 0.4 to about 2.

20 Claims, 7 Drawing Sheets

Half Cell Cycle Life

Related U.S. Application Data (60) Provisional application No. 62/850,116, filed on May 20, 2019.

(51) Int. Cl.
    *H01M 4/38*      (2006.01)
    *H01M 4/48*      (2010.01)
    *H01M 4/58*      (2010.01)
    *H01M 4/62*      (2006.01)
    *H01M 10/0525*      (2010.01)
    *H01M 4/02*      (2006.01)

(52) U.S. Cl.
    CPC ........... *H01M 4/48* (2013.01); *H01M 4/5815* (2013.01); *H01M 4/623* (2013.01); *H01M 10/0525* (2013.01); *H01M 2004/027* (2013.01)

(56) References Cited

U.S. PATENT DOCUMENTS

| | | | |
|---|---|---|---|
| 6,395,249 | B1 | 5/2002 | Kondo et al. |
| 7,037,581 | B2 | 5/2006 | Aramata et al. |
| 8,753,774 | B2 | 6/2014 | Kawada |
| 10,170,757 | B2 | 1/2019 | Watanabe |
| 10,184,930 | B2 | 1/2019 | Brueck et al. |
| 2002/0076614 | A1 | 6/2002 | Yoon et al. |
| 2004/0137328 | A1 | 7/2004 | Kim et al. |
| 2007/0224508 | A1 | 9/2007 | Aramata et al. |
| 2010/0021819 | A1* | 1/2010 | Zhamu ............ H01G 11/42 429/231.8 |
| 2010/0303706 | A1 | 12/2010 | Wallace et al. |
| 2011/0111303 | A1 | 5/2011 | Kung et al. |
| 2011/0244333 | A1 | 10/2011 | Kawada |
| 2011/0292570 | A1 | 12/2011 | Ivanovici et al. |
| 2012/0064409 | A1 | 3/2012 | Zhamu et al. |
| 2013/0344392 | A1* | 12/2013 | Huang ............ H01M 4/583 429/231.8 |
| 2014/0322606 | A1 | 10/2014 | Lee et al. |
| 2016/0285090 | A1 | 9/2016 | Ozkan et al. |
| 2017/0179476 | A1 | 6/2017 | Watanabe |
| 2019/0036116 | A1 | 1/2019 | Lu et al. |
| 2020/0373562 | A1 | 11/2020 | Lau et al. |
| 2021/0151742 | A1 | 5/2021 | Kim et al. |

FOREIGN PATENT DOCUMENTS

| | | |
|---|---|---|
| CN | 1254961 A | 5/2000 |
| CN | 106992292 A | 7/2017 |
| EP | 0508689 B1 | 1/2000 |
| JP | 2002-042887 A | 2/2002 |
| JP | 3952180 A | 5/2007 |
| JP | 4288455 A | 4/2009 |
| JP | 2009-129769 A | 6/2009 |
| KR | 10-1999-0080594 A | 11/1999 |
| KR | 10-2018-0070507 A | 6/2018 |
| KR | 102180122871 A | 11/2018 |
| WO | WO2011012874 A1 | 2/2011 |
| WO | WO2018/203599 A1 | 11/2018 |

OTHER PUBLICATIONS

Hirata, A. et al., "Atomic-scale disproportionation in amorphous silicon monoxide," Nature Communications, vol. 7, No. 11591, pp. 1-7, DOI: 10.1038/ncomms11591, (2016).

Hohl, A. et al., "An interface clusters mixture model for the structure of amorphous silicon monoxide (SiO)," Journal of Non-Crystalline Solids, vol. 320, pp. 255-280, (2003).

IPRP—Notification Concerning of Transmittal of International Preliminary Report on Patentability and Written Opinion of the International Search Authority for International Patent Application No. PCT/US2020/033422, dated Dec. 2, 2021, 8 pages.

ISR—Notification of Transmittal of the International Search Report and Written Opinion of the International Search Authority for International Patent Application No. PCT/US2020/033422, dated Sep. 1, 2020, 11 pages.

Kapaklis, V., "Structural characterization of silicon nanocrystals from amorphous silicon oxide materials," Journal of Non-Crystalline Solids, vol. 354 pp. 612-617, (2008).

Lee, J.I. et al., "Chemical-Assisted Thermal Disproportionation of Porous Silicon Monoxide into Silicon-Based Multicomponent Systems," Angewandte Chemie, International Edition, Nanoporous Materials, Angew. Chem. Int. Ed. 2012, vol. 51, pp. 2767-2771, DOI: 10.1002/anie.201108915 (2012).

Lu, Y. et al., "Yolk-Shell Si/SiO x @Void@C Composites as Anode Materials for Lithium-Ion Batteries," ResearchGate, Functional Materials Letters—Jul. 2018, DOI: 10.1142/S1793604718500947 (2018).

Mamiya, M. et al., "Preparation of fine silicon particles from amorphous silicon monoxide by the disproportionation reaction," Journal of Crystal Growth, vol. 229, pp. 457-461, (2001).

Shimosaki, S., "Si-based Materials Promising for High Capacity Anode, Focusing on SiO Whose Application has Started," 7th International Rechargeable Battery Expo—Battery Japan [BJ-6], Osaka Titanium Technologies Co., Ltd., High-Performance Material Technology Group, (2016).

Extended European Search Report including European Search Opinion for European Patent Application No. 20808869, dated Aug. 23, 2023, 8 pages.

JPO Office Communication for Japanese Patent Application No. 2021-569014 dated Jun. 27, 2023, 2 pages.

KIPO Office Communication, Notification of Preliminary Rejection for Korean Patent Application No. 10-2021-7040584, dated Sep. 18, 2023, 7 pages.

Mera, G. et al., "Polymer-derived SiCN and SiOC ceramics—structure and energetics at the nanoscale," Journal of Materials Chemistry A, vol. 12, No. 1, pp. 3826-3836, (2013); https://doi.org/10.1039/C2TA00727D (Abstract).

China National Intellectual Property Administration ("CNIPA") Office Communication, First Office Action for PRC (China) Patent Application No. 202080043768.0, dated Jan. 22, 2024, 8 pages.

KIPO Office Communication, Notification of Preliminary Rejection for Korean Patent Application No. 10-2021-7040584, dated Jan. 25, 2024, 3 pages.

\* cited by examiner

| Half Cell Evaluation 1.5 – 0.02 V | Specific Capacity (mAh/g) | 1st CE (0.02 – 1.5V) (%) | Cycles to 80% capacity |
|---|---|---|---|
| Low Defect Turbostratic Carbon | 1550 | 76% | 98 |
| Reduced Graphene Oxide | 1580 | 73% | 57 |

ANODE ACTIVE MATERIAL INCLUDING LOW-DEFECT TURBOSTRATIC CARBON

CROSS-REFERENCE TO RELATED APPLICATIONS

This application is a divisional of U.S. application Ser. No. 16/876,915, filed May 18, 2020, now U.S. Pat. No. 11,588,150, which claims priority to U.S. Provisional Application No. 62/850,116, filed May 20, 2019, all of which are incorporated herein by reference in their entirety.

TECHNICAL FIELD

This invention relates to anode active materials for electrochemical cells, and more particularly, to an advanced anode active material for use in a secondary lithium ion electrochemical cell, the anode active material comprising a composite particle including an active material and a low-defect turbostratic carbon material.

BACKGROUND

Lithium (Li) ion electrochemical cells typically require materials that enable high energy density, high power density and high cycling stability. Li ion cells are commonly used in a variety of applications, which include consumer electronics, wearable computing devices, military mobile equipment, satellite communication, spacecraft devices and electric vehicles, and are particularly popular for use in large-scale energy applications such as low-emission electric vehicles, renewable power plants, and stationary electric grids. Additionally, lithium-ion cells are at the forefront of new generation wireless and portable communication applications. One or more lithium ion cells may be used to configure a battery that serves as the power source for any of these applications. It is the explosion in the number of higher energy demanding applications, however, that is accelerating research for yet even higher energy density, higher power density, higher-rate charge-discharge capability, and longer cycle life lithium ion cells. Additionally, with the increasing adoption of lithium-ion technology, there is an ever increasing need to extend today's energy and power densities, as applications migrate to higher current needs, longer run-times, wider and higher power ranges and smaller form factors.

Silicon or silicon alloy anode materials are currently included in most long-term lithium-ion technology adoption roadmaps as a practical means to achieve higher energy and power densities. Silicon is a desirable negative electrode active material for lithium ion electrochemical cell applications having a theoretical gravimetric capacity of about 4,200 mAh/g and volumetric capacity of about 9786 mAh/$cm^3$ when fully lithiated. Silicon is also a desirable replacement for current graphite-based anodes as its high lithium storage capacity can exceed 7× that of graphite. Market adoption of silicon-based anodes for use in lithium ion cells, however, has been challenged by rapid cycle life degradation, poor charge-discharge rate capability under high power demands, and subpar or deficient coulombic efficiency, all of which may result from extreme anode volume changes during charge and discharge (volume expansions of up to 400% have been noted). Cycle life degradation in silicon-based alloys is well understood, and can be broken down into two fundamental mechanisms: (1) electrical disconnection, and (2) unstable solid electrolyte interface (SEI) resulting in lithium ion consumption and impedance growth. High rate capability and coulombic efficiency are also compromised by these mechanisms. Electrical disconnection occurs with significant volume fluctuations during charge and discharge due to large volume changes upon lithiation and delithiation.

These large volume changes may cause pulverization (stress-induced cracking and fracture) of the silicon particles and loss of electrical contact between these active silicon particles. The result is an electrochemical cell having low power capability and rapid capacity fade. The cracking and fracture introduced in mechanism (1) further worsens cell performance by subsequently promoting mechanism (2), an unstable SEI. Because cracking and fracture expose new Si surfaces to the electrolyte solvents, further SEI formation occurs, depositing lithiated compounds on the new Si surfaces. During charge/discharge cycling, the insulating SEI layer also grows thicker, further degrading the capacity and cycling stability of the Si anode, and compromising charge/discharge rate capability and coulombic efficiency.

Continuous and new growth of the SEI layer gradually deplete the available $Li^+$ and, due to side reactions with the electrolyte solvent and salt(s), the amount of serviceable electrolyte is depleted as well, thereby deteriorating overall electrochemical cell performance. The use of silicon-based anodes in applications requiring high electrochemical cell charge/discharge rates, therefore, is severely limited resultant from the high ohmic and ionic contributions to polarization resulting from these mechanisms.

Improving the cycling stability of high specific capacity silicon or silicon alloy anodes has been a topic of development for decades. Various approaches have been taken regarding silicon anode cycle life stabilization, such as, but not limited to, (i) anode particle structure, (ii) particle size control, (iii) particle surface coating or encapsulation, (iv) composite particle composition and/or structure, (v) void space engineering, and (vi) carbon-containing anode composite material mixture. Utilizing variants of carbon has been one of the most popular methods of stabilizing silicon alloy anode cycle life, due to carbon's favorable physical and electrochemical properties. Carbon additions to composite anode material mixtures have been shown to be useful in providing a silicon-based anode with a conductive network and/or matrix that buffers volume expansion during lithiation and delithiation. Moreover, nano carbon materials having limited atomic layers, from one to a few, have been shown to be particularly beneficial to silicon-based anodes for their ability to sustain intimate contact with silicon particles during volume expansion and contraction. Carbon materials, such as graphite, graphene, graphene oxide, reduced graphene oxide, exfoliated graphite or graphene, graphene nanoplatelets or nanoparticles, nanoplatelets or nanoparticles comprising platelets comprising one or more graphene layers, carbon nanotubes (CNTs) such as single walled, double walled or multi-walled CNT, have all shown, independently or in combination, to be a beneficial addition to electrode material mixtures.

It is well established that the quality of graphene highly depends on the manufacturing and processing conditions when fabricated. For example, the defect density in graphene nanosheets via graphene oxide can be heavily impacted by various modifications to the Hummers' production method and subsequent reduction processes. The effect of graphene quality on the performance of battery electrodes, however, has yet to be fully characterized. For example, the effects of carbon material defect density and/or lattice stacking on electrochemical cell performance is substantially lacking. Historically, a scanning electron microscope (SEM) has typically been a first option to observe the morphology of Si/graphene composites. However, the thickness and number of layers of graphene and defect density cannot be properly quantified due to the limitations of SEM imaging. A transmission electron microscope (TEM) has been applied to investigate the crystal structure of Si/graphene nanocomposites. By adjusting the contrast of a TEM image, a graphene sheet can be isolated from Si/graphene nanocomposites due to its thin thickness and relatively low atomic weight, however, determining number of layers and defining defect density is still improbable. An atomic force microscope (AFM) has been utilized to measure thickness of graphene nanosheets. Many fabricated Si/graphene nanocomposites have been shown to have graphene thickness of less than 10 nm; however, AFM is unable to determine graphene thickness or defect characteristics.

Accordingly, there is a need for an advanced anode material mixture for use in an electrochemical cell that incorporates carbon materials of defined quality characteristics that favorably impact electrochemical cell cyclability. More specifically, there is a need for advanced silicon-based anode mixture compositions that comprise low-defect turbostratic carbons that enable lithium ion electrochemical cell cycle life stability, energy density, and rate performance.

SUMMARY

According to various embodiments of the present disclosure, provided is an electrode material comprising composite particles, each composite particle comprising: a primary particle comprising an electrochemically active material; and an envelope disposed on the surface of the primary particle, the envelope comprising turbostratic carbon having a Raman spectrum having: a D band having a peak intensity ($I_D$) at wave number between 1330 cm$^{-1}$ and 1360 cm$^{-1}$; a G band having a peak intensity ($I_G$) at wave number between 1530 cm$^{-1}$ and 1580 cm$^{-1}$; and a 2D band having a peak intensity ($I_{2D}$) at wave number between 2650 cm$^{-1}$ and 2750 cm$^{-1}$. In one embodiment, a ratio of $I_D/I_G$ ranges from greater than zero to about 1.1, such as to about 0.8; and a ratio of $I_{2D}/I_G$ ranges from about 0.4 to about 2, such as about 0.5 to about 2.

According to various embodiments of the present disclosure, the envelope comprising a low-defect, turbostratic carbon that comprises graphene layers that partially overlap one another on the surface of the primary particle to simulate larger single-sheet structures. In some embodiments the turbostratic carbon may be in the form of platelets having one or more than one layers of graphene. In some embodiments, the turbostratic carbon has a low thickness. In some embodiments, the turbostratic carbon is crumpled resembling a crumpled ball-like structure. In some embodiments, the turbostratic carbon wraps around or is bonded to particles of an electrode material.

According to various embodiments of the present disclosure, provided is the active material comprises a metalloid or metal oxide material.

According to various embodiments of the present disclosure, provided is an electrochemical cell comprising a cathode, an anode and a non-aqueous electrolyte comprising a lithium salt disposed between the cathode and the anode, wherein the anode comprises low-defect turbostratic carbon. In some embodiments of the electrochemical cells, the low-defect turbostratic carbon is part of a particle structure. In some embodiments of the electrochemical cells, the low-defect turbostratic carbon is part of an electrode material composition. In some embodiments of the electrochemical cells, the low-defect turbostratic carbon is part of an electrode structure.

According to various embodiments of the present disclosure, provided are methods of making turbostratic carbon and composite particles, electrode material powder compositions, electrochemical cell electrodes and electrochemical half cells. These embodiments comprise low-defect turbostratic carbon.

Other principal features and advantages of the invention will become apparent to those skilled in the art upon review of the following drawings, the detailed description, and the appended claims.

DETAILED DESCRIPTION OF THE PREFERRED EMBODIMENTS

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention. It will also be understood that the term "about" may refer to a minor measurement errors of, for example, +/−5% to 10%.

Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

An "electrode material" is defined as a material that may be configured for use as an electrode within an electrochemical cell, such as a lithium ion rechargeable battery. An "electrode" is defined as either an anode or a cathode of an electrochemical cell. A "composite electrode material" is also defined to include active material particles combined with particles or platelets of electrically conductive carbon materials, either as a single material of a specific carbon type, such as a low-defect turbostratic carbon, or combinations of more than one specific carbon type. An "electrode material mixture" is defined as a combination of materials such as: material particles (either electrochemically active, electrically conductive, composite or combinations thereof), a binder or binders, a non-crosslinking and/or a crosslinking polymer or polymers, which are mixed together for use in forming an electrode for an electrochemical cell. An "electrochemically active material", "electrode active material" or "active material" is defined herein as a material that inserts and releases ions such as ions in an electrolyte, to store and release an electrical potential. The term "inserts and releases" may be further understood as ions that intercalate and deintercalate, or lithiate and delithiate. The process of inserting and releasing of ions is also understood, therefore, to be intercalation and deintercalation, or lithiation and delithiation. An "active material" or an "electrochemically active material" or an "active material particle", therefore, is defined as a material or particle capable of repeating ion intercalation and deintercalation or lithium lithiation and delithiation.

A "defect" is defined as any feature that disrupts the symmetry of the hexagonal lattice of carbon atoms in a given sheet of carbon. In accordance with this definition, a defect may include vacancies, substitutional atoms, edges, grain boundaries or changes to the carbon-hybridization. "Hybridization" is the mixing of standard atomic orbitals to form new orbitals, which can be used to describe bonding in molecules. Mixing of standard atomic orbitals commonly occurs with $sp^2$ and $sp^3$ orbitals.

Defect density is defined as the quantity of symmetry breaking features (defects) in a given unit area of a carbon plane. This value is often estimated as the mean distance between two defects. Defect density can be approximated with Raman spectroscopy using the ratio of $I_D/I_G$.

A "composite particle" may comprise a primary particle or core comprising an electrochemically active material and an envelope disposed on the surface of the primary particle. The envelope may comprise turbostratic carbon.

According to various embodiments of the present disclosure, the primary particles are at least partially encapsulated (e.g., covered) by the envelope. For example, the envelopes and/or the turbostratic carbon may cover, on average, from about 10% to about 100%, such as from about 20% to about 90%, from about 25% to about 80%, from about 30% to about 70%, or from about 40% to about 60% of the surface of each primary particle.

An "envelope" may be a capsule or shell that at least partially covers, encloses, or encapsulates a core material such as at least one primary particle. The primary may comprise an electrochemically active material, such as met-alloid or metal oxide material that is capable of yielding reversible lithium storage capacity. In some embodiments, the envelope may have a crumpled morphology. The term "crumpled" is defined as a body or mass displaying a distribution of creases, ripples, folds, wrinkles, and ridges. The term "crumpled" is also defined as to make or become curved. The term "morphology" is defined as a structure and feature or features of a surface. Specifically, "morphology" is the structure and features of the exterior surface of a particle or a macroparticle of an electrode material.

As defined herein a "secondary" electrochemical cell is an electrochemical cell or battery that is rechargeable. "Capacity" is defined herein as a measure of charge stored by a battery as determined by the mass of active material contained within the battery, representing the maximum amount of energy, in ampere-hours (Ah), which can be extracted from a battery at a rated voltage. Capacity may also be defined by the equation: capacity=energy/voltage or current (A)×time (h). "Energy" is mathematically defined by the equation: energy=capacity (Ah)×voltage (V). "Specific capacity" is defined herein as the amount of electric charge that can be delivered for a specified amount of time per unit of mass or unit of volume of active electrode material. Specific capacity may be measured in gravimetric units, for example, (Ah)/g or volumetric units, for example, (Ah)/cc. Specific capacity is defined by the mathematical equation: specific capacity (Ah/kg)=capacity (Ah)/mass (kg). "Rate capability" is the ability of an electrochemical cell to receive or deliver an amount of energy within a specified time period. Alternately, "rate capability" is the maximum continuous or pulsed energy a battery can provide per unit of time. "C-rate" is defined herein as a measure of the rate at which a battery is discharged relative to its maximum nominal capacity. For example, a 1C current rate means that the discharge current will discharge the entire battery in 1 hour; a C/2 current rate will completely discharge the cell in 2 hours and a 2C rate in 0.5 hours. "Power" is defined as the time rate of energy transfer, measured in Watts (W). Power is the product of the voltage (V) across a battery or cell and the current (A) through the battery or cell. "C-Rate" is mathematically defined as C-Rate (inverse hours)=current (A)/capacity (Ah) or C-Rate (inverse hours)=1/discharge time (h). Power is defined by the mathematical equations:

power (W)=energy (Wh)/time (h) or power (W)=current (A)×voltage (V). Coulombic efficiency is the efficiency at which charge is transferred within an electrochemical cell. Coulombic efficiency is the ratio of the output of charge by a battery to the input of charge.

The present application discloses, among other things, a composite particle comprising an active material and a low-defect turbostratic carbon material additive. Further disclosed is a composite electrode material, an electrochemical cell and relate processes therefor. The low-defect turbostratic carbon material may comprise an element of one of the group consisting of: a particle structure, a particle structure having an active material particle as a first component, an electrode material, an electrode, an electrochemical cell, and combinations thereof. The low-defect turbostratic carbon provides improved cycling stability and high rate performance compared to other carbon-based materials used in an electrochemical cell. Specifically, a low-defect low thickness turbostratic graphene and methods therefor, when incorporated as an element of a structure used in an electrochemical cell provides superior performance of said electrochemical cell compared with other electrochemical cells using other carbon materials.

Raman spectroscopy is a technique used to observe vibrational, rotational, and other low-frequency modes in a system. Raman spectroscopy is commonly used in chemistry to provide a structural fingerprint by which molecules can be identified. The technique relies on inelastic scattering, or Raman scattering, of monochromatic light, usually from a laser in the visible, near infrared, or near ultraviolet range. The laser light interacts with molecular vibrations, phonons or other excitations in the system, resulting in the energy of the laser photons being shifted up or down. The shift in energy gives information about the vibrational modes in the system. Raman spectroscopy thereby allows the identification and characterization of carbon-based materials, ranging from very well organized carbons such as four coordinated diamond; to three coordinated aromatic carbons such as graphene, nanotubes, nanoplatelets, nanocones and nanoribbons, down to amorphous carbons. Multi-wavelength Raman spectroscopy has proven to be a very powerful non-destructive tool for the characterization of such carbons. Depending on the material studied, some specific spectroscopic parameters (e.g., band position, full width at half maximum, relative intensity ratio between two bands) are used to characterize defects.

The sp2 hybridized carbons constitute a broad class of solid phases composed primarily of elemental carbon and can be either synthetic or naturally occurring. Some non-limiting examples are graphite, graphene, carbon nanotubes, and pyrolytic carbon. These carbons may vary from highly ordered or crystalline to completely disordered or amorphous solids and detailed knowledge of their internal structure and composition is of utmost importance for the scientific and engineering electrochemical cell communities working with these materials.

Interestingly, graphene, being the fundamental building block for all graphitic materials, currently has no universal standard material definition as it relates to its use in electrochemical cells. As a result of this lack of scientific clarity, many forms of graphene or graphene-like materials have been used as electrode additives, including, but not limited to, monolayer graphene, few-layer graphene, multi-layer graphene, carbon nanoribbons, and carbon nanoplatelets, graphene oxide, and reduced graphene oxide. Confusingly, all of these materials are often vaguely labeled in scientific and legal publications as graphene despite not adhering to the scientific definition of graphene. Because this standard definition for an electrochemical cell graphene material or a group of graphene materials does not exist, choosing the correct graphene-like carbon material suitable for use as additives to electrochemical cell active material mixtures is currently challenging.

Graphene is a material of interest for use in electrochemical cells as graphene is an extremely efficient conductor of electrical and thermal energy. Graphene is also lightweight, chemically inert, and flexible. Because graphene, however, is produced using a number of processes, electrochemical cell performance results have been varied, and often disappointing. Non-limiting processes for producing graphene include mechanical cleavage, epitaxial growth, chemical vapor deposition, and chemical or mechanical exfoliation. Since so many different processes can be used to make a graphene or graphene-like product, it is expected that the graphene may contain a number of carbon species within, may have unwanted by-products which are remnants of the process, may have potentially detrimental structural damage resulting from the process or combinations thereof.

The Raman spectra of all carbon systems show some prominent features regardless of the final structure, whether the final structure is a conjugated polymer or a fullerene. Moreover, carbon system spectra characteristically display intense bands in the 1000-2000 cm$^{-1}$ region, in addition to a few other second-order modulations that appear in the spectrum. The shape, intensity and positions of the peaks in the spectrum allow differentiation between, for example, a hard amorphous carbon, from a carbon nanotube.

Figure 1A:
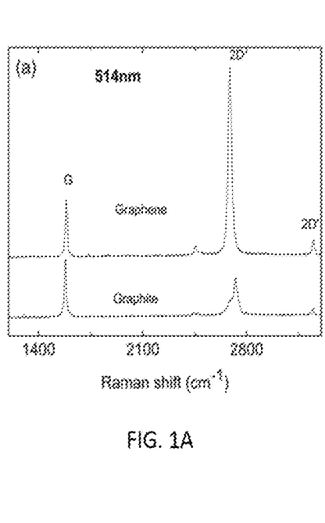
FIGS. 1A, 1B and 1C illustrate Raman spectra for graphite and various graphene-based materials.
Figure 1B:
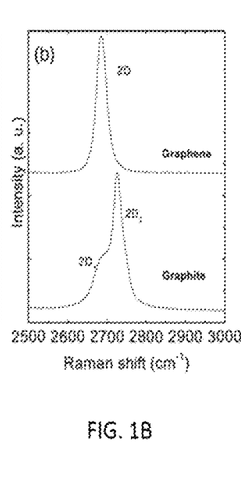
Figure 1C:
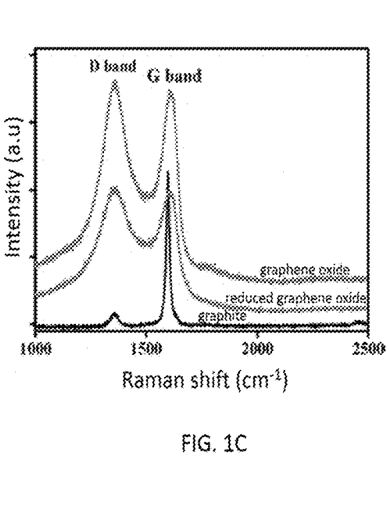

FIGS. 1A, 1B and 1C illustrate Raman spectra for graphite and various graphene-based materials. It has been well established that graphite and graphene materials have characteristic peaks at approximately 1340 cm$^{-1}$, 1584 cm$^{-1}$ and 2700 cm$^{-1}$. The peak at 1340 cm$^{-1}$ is shown in FIG. 1C, and is characterized as the D band. The peak at 1584 cm$^{-1}$ is shown in the spectra of FIGS. 1A and 1C, and is characterized as the G band, which results from the vibrational mode represented by the C=C bond stretching of all pairs of sp$^2$ hybridized carbon atoms. The D band originates from a hybridized vibrational mode associated with graphene edges and it indicates the presence of defects or broken symmetry in the graphene structure. The peak at 2700 cm$^{-1}$ is shown in FIG. 1B, and is characterized as the 2D band, which results from a double resonance process due to interactions between stacked graphene layers. The emergence of a double peak at the 2D wavenumber breaks the symmetry of the peak, and is indicative of AB stacking order between graphene planes in graphite and graphite derivatives such as nanoplatelets. The $2D_1$ peak shown in FIG. 1B becomes suppressed when the AB stacking order in turbostratic multilayer graphene particles is disrupted. The positions of the G and 2D bands are used to determine the number of layers in a material system. Hence, Raman spectroscopy provides the scientific clarity and definition for electrochemical cell carbon material additives, providing a fingerprint for correct selection as additives for active material electrode compositions. As will be shown, the present definition provides that fingerprint for the low-defect turbostratic carbon of the present application. It is this low-defect turbostratic carbon when used as an additive to an electrochemical cell electrode active material mixture that provides superior electrochemical cell performance.

Figure 2:
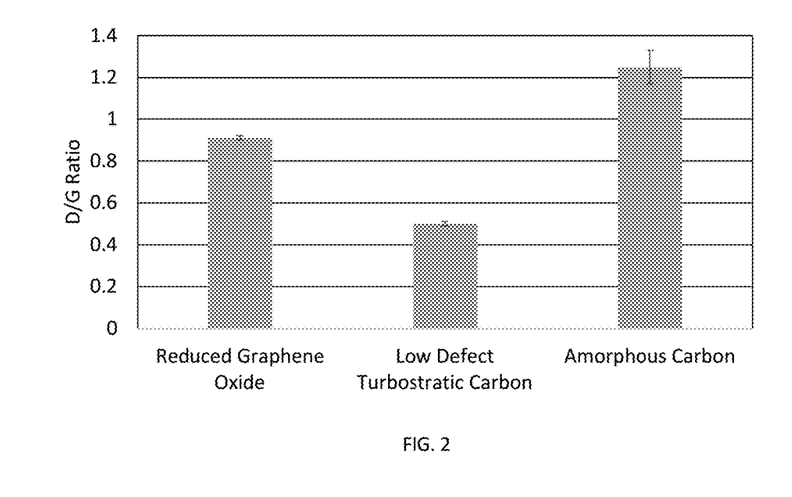
FIG. 2 is a bar chart comparing the Raman spectra $I_D/I_G$ ratios of typical carbon materials to low-defect turbostratic carbon.

FIG. 2 provides the $I_D/I_G$ ratio of carbon additives typically used in prior art electrode active material mixtures (i.e., reduced graphene oxide or amorphous carbon) compared with the low-defect turbostratic carbon of the present application.

Figure 4:
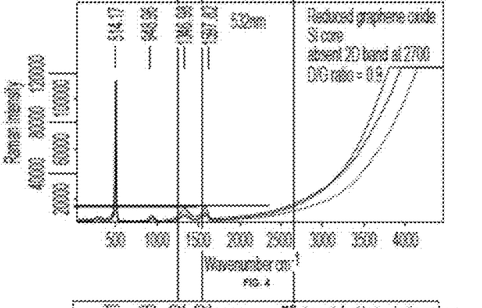
FIG. 4 illustrates the Raman spectrum of an electrode active material comprising $SiO_x$ primary particles encapsulated by a reduced graphene oxide (rGO).

Reduced graphene oxide (rGO) is a carbon variant that is often referred to as graphene in the industry, however, is unique in final structure and manufacturing process. Graphene oxide is typically manufactured first using a modified Hummers method wherein a graphite material is oxidized and exfoliated into single layers or platelets comprising a few layers of carbon that may comprise various functional groups, including, but not limited to, hydroxyls, epoxides, carbonyls, and carboxyls. These functional groups are then removed through chemical or thermal treatments that convert the insulating graphene oxide into conductive reduced graphene oxide. The reduced graphene oxide is similar to graphene in that it consists of single layers of carbon atom lattices, but differs in that it has mixed sp2 and sp3 hybridization, residual functional groups and often increased defect density resultant from the manufacturing and reduction processes. Reduced graphene oxide is shown in the first bar of FIG. 2 and has an $I_D/I_G$ ratio of 0.9 and does not exhibit 2D resonance around 2700 cm$^{-1}$ as shown in FIG. 4.

Amorphous carbon is often used as an additive or surface coating for both electrochemical cell anode and cathode material mixtures to enhance electrode conductivity. Typically, amorphous carbons are produced using a chemical vapor deposition (CVD) process wherein a hydrocarbon feedstock gas is flowed into a sealed vessel and carbonized at elevated temperatures onto the surface of a desired powder material. This thermal decomposition process can provide thin amorphous carbon coatings, on the order of a few nanometers thick, which lack any sp2 hybridization as found in crystalline graphene-based materials. Amorphous carbon is shown in the third bar of FIG. 2 and has an $I_D/I_G$ ratio >1.2.

Low-defect turbostratic carbon, also referred to as graphene, comprises unique characteristics resultant from its manufacturing processing. One common method of producing this material is through a plasma based CVD process wherein a hydrocarbon feedstock gas is fed through an inert gas plasma in the presence of a catalyst that can nucleate graphene-like carbon structures. By controlling the production parameters, carbon materials having a few layers and absent any AB stacking order between lattices can be produced. These carbon materials are typically highly ordered sp2 carbon lattices with low-defect density.

The low-defect turbostratic carbon of the present disclosure is shown in the center second bar of FIG. 2. The Raman spectrum of the low-defect turbostratic carbon additive of the present application is derived from the intensity ratio of the D band and the G band ($I_D/I_G$) and the intensity ratio of the 2D band and the G band ($I_{2D}/I_G$). The $I_D$, $I_{2D}$, and $I_G$ are represented by their respective integrated intensities. A low $I_D/I_G$ ratio indicates a low-defect material. The low-defect turbostratic carbon material of one embodiment of the present invention has an $I_D/I_G$ ratio of greater than zero and less than or equal to about 1.1, such as less than or equal to about 0.8, as determined by Raman spectroscopy with $I_G$ at wavenumber in a range between 1530 and 1580 cm$^{-1}$, $I_D$ at wavenumber in a range between 1330 and 1360 cm$^{-1}$, and being measured using an incident laser wavelength of 532 nm. Additionally, the low-defect turbostratic carbon material of the one embodiment of the present disclosure exhibits an $I_{2D}/I_G$ ratio of about 0.4 or more, such as 0.5 or more. As reference regarding the $I_{2D}/I_G$ ratio, an $I_{2D}/I_G$ ratio of approximately 2 is typically associated with single layer graphene. $I_{2D}/I_G$ ratios of less than about 0.4 is usually associated with bulk graphite consisting of a multitude of AB stacked graphene layers. Hence, the $I_{2D}/I_G$ ratio of about 0.4 or more, such as about 0.5 or more for the low-defect turbostratic carbon material of the present disclosure, indicates a low layer count of ≤10. The low-defect turbostratic carbon material of low layer count further lacks an AB stacking order between graphene layers (i.e., turbostratic). The turbostratic nature or lack of AB stacking of these graphene planes is indicated by the symmetry of the $I_{2D}$ peak. It is the symmetry of the 2D peak that distinguishes a turbostratic graphene layered material from an AB stacked graphene layered material, and is indicative of rotational stacking disorder versus a layered stacking order.

Carbon materials with high AB stacking order will still exhibit 2D peaks, however, these 2D peaks exhibit a doublet that breaks the symmetry of the peak. This break in symmetry is exhibited in both AB stacked graphene of a few layers or graphite of many layers. Thus, the 2D peak, which is a very strong indicator of the presence of stacking order regardless of the number of graphene layers present in the material, is of significance when selecting a graphene or graphene-based additive. It is the rotational disorder of the stacking in the low-defect turbostratic carbon of the present disclosure that distinguishes itself from all the other graphene or graphene-based additives used to date, as the rotational disorder of the low-defect turbostratic carbon stacking of the present application is what offers flexibility to the carbon-based particles of the present application, which therein enables the ability of these carbon-based particles to provide and preserve contact with the active primary particle of the composite particles comprising the electrode of the electrochemical cell. The result is an electrochemical cell having increased cycle life, better cycle life stability, enhanced energy density, and superior high rate performance.

Silicon and silicon alloys significantly increase cell capacity when incorporated within an electrode of an electrochemical cell. Silicon and silicon alloys are often incorporated within an electrode comprising graphite, graphene, or other carbon-based active materials. Examples of electrodes comprising carbon-based materials and silicon are provided in U.S. Pat. Nos. 8,551,650, 8,778,538, and 9,728,773 to Kung et al., and U.S. Pat. Nos. 10,135,059, and 10,135,063 to Huang et al., all the contents of which are fully incorporated herein by reference.

One embodiment of the present material comprises a composite particle. The composite particle may comprise at least one primary particle (i.e., active material particle), wherein the primary particle comprises a metalloid or a metal oxide material. The primary particle may be an anode active material particle. The primary particles may have an average particle size ranging from about 1 μm to about 15 μm. Alternately, the average primary particle size may be less than about 1 μm. The primary particle may have a surface area ranging from about 0.5 m$^2$/g to about 50 m$^2$/g. In an embodiment, the metal oxide of the primary particle comprises silicon oxide (SiO$_x$), wherein x ranges from about 0.1 to about 1.3, such as from 0.8 to 1.2, including from 0.9 to 1.1. In an embodiment, the primary particle comprises a lithium-containing silicon oxide (Li$_z$SiO$_x$), wherein x ranges from about 0.1 to about 1.3 and z ranges from greater than zero to about 4.0. Some embodiments may comprise a low-defect turbostratic carbon material, the low-defect carbon material surrounding, encapsulating, interweaving, dispersed about, or integrated and/or agglomerated with the primary particle.

The composite particle may further comprise an envelope disposed on the surface of the primary particle and comprising a low-defect turbostratic carbon. The envelope and/or low-defect turbostratic carbon may at least partially cover or encapsulate the primary particles. The envelope may comprise the low-defect turbostratic carbon in the form of platelets comprising from one to about 10 sheets of a graphene, graphene oxide, or reduced graphene oxide. In some embodiments, the at least 90%, such as from about 90% to about 100% of the layers or platelets may be formed of graphene.

In an embodiment, the composite particles may have an average particle size of ≤10 µm. In an embodiment, an average particle size may be about 1 µm or less. In an embodiment, an average size of the composite particles may range from about 0.5 µm to about 15 µm, from about 0.5 µm to about 5 µm, from about 0.5 µm to about 2 µm, or from about 0.5 µm to about 1.5 µm. The composite particles may be included in an active electrode material, such as an active anode electrode material.

The composite particles may be formed by combining the electrochemically active and the low-defect turbostratic carbon materials in a dry weight ratio between 7:3 and 99:1. The raw active and carbon materials are first suspended in a polar liquid solvent such as water or ethanol by high shear mixing or ultrasonication. An important advantage of low-defect turbostratic carbon is that it can be suspended in a polar solvent at high solids loadings making it suitable for low cost wet chemistry processing. Graphene oxide is a possible option because of its various oxygen-containing functional groups. The oxygen-containing functional groups are attached to the carbon lattice and enable suspension of the graphene oxide in various polar solvents at a low solids loading. Other types of carbon additives often lack suspension capability and therefore must be dry processed or grown directly on the host material. A suspension of some materials may also be promoted through the use of a surfactant such as polyvinylpyrrolidone (PVP). Of significance is that the high conductivity enabled by the low-defect turbostratic structure allows lower ratios of the material (<90:10 and as low as 99:1) to be mixed with the electrochemically active material for comparable conductivity enhancements when compared to other carbon additives.

Once the raw material suspension is made, it is then aerosolized and dried in a vacuum heating chamber to force the suspended solids into intimate contact. Depending on the final powder particle requirements, process parameters may vary. For example, crumpled ball-like composite particles are formed by aerosolizing droplets and then rapidly drying them in the heating chamber. For example, an atomizer nebulizes the raw material suspension to form aerosol droplets. The nebulizing step requires sufficient spray parameters to allow the particles within the droplets to become ordered before aerosol evaporation initiates. For turbostratic carbon materials, the particles within the droplet migrate to the surface of the droplet to form a hollow envelope of sphere upon drying. If the droplet only contains turbostratic carbon, the envelopes may be used as a conductive additive to an electrode material. The envelopes minimize particle aggregation and agglomeration as this structure overcomes strong inter-particle van der Waals attraction forces that cause restacking of carbon material sheets which complicates solution processability and reduces particle accessible surface area. This structure is also stable against unfolding or collapsing.

If the droplet contains both a carbon-based material and an electrochemically active material, then the electrochemically active material may locate centrally in the droplet, while the carbon-based material may be localized at the surface of the droplet. The ordered aerosol droplets being flown through a preheated furnace allow the carbon-based material particles to localize, cluster and tile at the droplet surface which are then ready to encapsulate the electrochemically active material centrally located within the droplet. The clustering and tiling while encapsulating occurs as the droplet shrinks due to evaporation during drying. The turbostratic carbon is then concentrated fully surrounding the electrochemically active material internal cargo, forming an initial ball-like structure. As the droplet continues to shrink, curvature is introduced followed by pronounced wrinkles, bends and twisted edges. Eventually, the platelets/sheets isotropically compress through capillary forces that fully crumple, transforming into crumpled balls having a myriad of wrinkles, bends and twists that do not relax over time. This structural transformation of the carbon-based particles to form an envelope surrounding the core material is important to the integrity of the particle, as any relaxation of the turbostratic carbon envelope would re-introduce the internal particle cargo to electrolyte exposure and the effects of fracture and unstable SEI formation.

Preparation of the dispersion solution to be aerosolized is also important, as the intention is to create a heterogeneous droplet comprising solid particles suspended in the liquid forming the droplet. The liquid forming the droplets should be one that preserves the integrity of the particles within so that particles will isotropically compress and plastically deform to form a near-spherical particle just like a crumpled paper ball. Additionally, it is important for the droplets to be sustained in the furnace carrier gas for the duration (that is, until full evaporation is achieved) in order to complete the crumpled ball-like envelope and the encapsulation of the internal cargo. In this way, an aerosol assisted evaporation capillary compression process forms particles resembling hollow balls that resists aggregation, exhibits excellent processability, and can either be used as an electrically conductive additive or can alternately encapsulate an electrochemically active internal cargo for use in electrodes of electrochemical cells.

Once droplet evaporation is complete, the dry powder is collected. After collection, the dry powders may be heat treated in an inert atmosphere, such as argon gas, to carbonize any remaining surfactant or dispersant. The resulting dry powder can then be classified by sieving or filtration to achieve a desired particle size distribution for a given application.

One embodiment of the present material comprises an active electrode material, the active electrode material comprising a metalloid or metal oxide active material. The active material may comprise an active anode material, wherein the active anode material comprises a metalloid or metal oxide material. The active material may additionally comprise a carbon-based material additive. The carbon-based material additive may comprise a low-defect turbostratic carbon-based material. In some embodiments, the low-defect turbostratic carbon comprises graphene platelets that are part of a structure comprising a continuous network for a composite electrode material comprising: (a) a mechanical support for an active electrode material; and (b) an electrically conductive pathway for the active electrode material. The mechanical support assists the electrically conductive pathway by providing and preserving contact between the active electrode material and the carbon-based material additive during electrochemical cell cycling.

One embodiment of the present material comprises an electrode, the electrode comprising a metalloid or metal oxide active material. The electrode may alternately comprise a carbon-based material. The electrode may comprise both a metalloid or metal oxide material and a carbon-based material. The carbon-based material may include low-defect turbostratic carbon, which may be present at crumpled platelets comprising one or more sheets of graphene. The electrode may comprise: a composite particle; an electrochemically active particle; an electrically conductive particle; an electrically insulating particle; a chemically active particle; an intercalating/deintercalating particle; a carbon-based particle; a metalloid or metal oxide particle; an alloy particle; a crumpled particle; an agglomerated particle; a composite particle; and combinations thereof. In some embodiments, the composite particle diameter may be on average ≤1 µm. In some embodiments, the composite particle diameter may range from about 1 µm to about 15 µm. The electrode may comprise turbostratic carbon sheets or platelets that partially overlap to simulate larger size single sheet structures. In some embodiments the platelets have more than one or more layers of a graphene-based material. In some embodiments, the platelets may have sheet size may be on average ≤15 µm. In some embodiments, the platelets may have sheet size may be on average ≤1 µm. In some embodiments, the turbostratic carbon-based material platelets may have low thickness. In some embodiments, a low thickness of the turbostratic carbon-based material platelets may be on average ≤1 µm. In some embodiments, a low thickness of the turbostratic carbon-based material platelets may be on average ≤100 nm. In some embodiments, the turbostratic carbon-based material platelets wrap around, weave/interweave through or are bonded to at least some of the particles of the electrode material in the electrode. The electrode may further comprise one of a binder or binders, a non-crosslinking polymer or polymers, a crosslinking polymer or polymers, and combinations thereof. The electrode may be one of an anode, a cathode, or both.

Low-defect turbostratic carbon materials are conducive for electrode slurry coating techniques. Electrodes may comprise a low-defect turbostratic carbon material and, optionally, a binder and an additional electrochemically active material. Electrodes may comprise one of the following: (1) a low-defect turbostratic carbon material or materials only; (2) a low-defect turbostratic carbon material or materials and other carbon-base material additives, such as carbon black, graphite, graphite oxide, graphene, exfoliated graphite or graphene, graphene oxide, rGO, partially reduced GO, carbon nanotubes (CNTs) such as single walled, double walled or multi-walled CNTs, graphene platelets, nanoplatelets or nanoparticles, nanoplatelets or nanoparticles comprising a graphene sheet or a few graphene sheets, and combinations thereof; (3) a low-defect turbostratic carbon material or materials and a cathode active material or materials, such as: a metal oxide, a lithiated metal oxide, a metal fluoride, a lithiated metal fluoride or combinations thereof; a sulfur, a lithium sulfide, a metal fluoride, a lithium metal fluoride, a lithium metal phosphate, and a lithium metal silicate where the metal may comprise a transition metal, such as iron, manganese, cobalt, nickel, copper, vanadium, chromium, and/or non-transition metals such as bismuth, and combinations thereof; lithium rich cathode active electrode materials which may include magnesium, strontium, barium, cadmium, zinc, aluminum, gallium, boron, zirconium, titanium, calcium, selenium, yttrium, niobium, chromium, iron, vanadium, lithium and combinations thereof; and (4) a low-defect carbon-based material or materials and an anode active material or materials comprising an anode active constituent, the anode constituent comprising a metalloid or metal oxide material.

The electrode may comprise a composite material mixture capable of providing 100% of the anode lithium capacity or may be mixed with other lithium active materials such as graphite, graphite oxide, graphene, graphene oxide, rGO, and partially reduced GO in a 0-100% mixture. If the electrode includes a binder to hold the electrode material together, the binder may comprise a polymeric material such as a polyacrylic acid or polyvinylidene fluoride (PVDF), carboxy methyl cellulose (CMC), styrene butadiene rubber (SBR), CMC/SBR, polyacrylic acid (PAA), lithium polyacrylic acid (LiPAA), or combinations thereof. The electrode material components are then mixed into a polar solvent such as water or N-methyl-2-pyrrolidone (NMP) at a solids loading in the range of about 20 wt % to about 60 wt % to form an electrode slurry. Mixing is typically achieved with a planetary mixer and high shear dispersion blade. The electrode slurry is then coated onto a metal substrate, typically copper or aluminum, at an appropriate mass loading to balance the lithium capacity of the anode with that of the selected cathode. Coating can be conducted using a variety of apparatus such as doctor blades, comma coaters, gravure coaters, and slot die coaters. After coating the slurry is dried under forced air between room temperature and about 120° C. Prior to cell assembly, the final electrode processing steps include pressing the electrode to reduce internal porosity and slitting to an appropriate geometry. Typical pressed densities can range from about 1.0 g/cc to about 1.7 g/cc depending on the composition of the electrode and the target application.

One embodiment of the present material comprises an electrochemical cell, the electrochemical cell comprising an anode, a cathode and a non-aqueous electrolyte comprising a lithium salt. The anode comprises a metalloid or metal oxide material. The anode further comprises a low-defect turbostratic carbon material. The anode may comprise composite particles. The composite particles may further comprise a crumpled ball-like structure, wherein the crumpled structure comprises a low-defect turbostratic carbon material encapsulating a metalloid or metal oxide material in its core. The anode may alternately comprise an anode material mixture having particles comprising a metalloid or metal oxide material and particles comprising a turbostratic carbon material. The turbostratic carbon material may comprise low-defect turbostratic carbon sheets that wrap around and/or are bonded to at least some of the primary particles comprising the metalloid or metal oxide material. The cathode may comprise a carbon-based material. In addition to the traditional carbon-based materials used in electrochemical cell cathode electrodes, it is contemplated that the low-defect turbostratic carbon material of the present application may also be used as an additive to the cathode electrode of an electrochemical cell.

Construction of an electrochemical cell involves the pairing of a coated anode substrate and a coated cathode substrate that are electronically isolated from each other by a polymer and/or a ceramic electrically insulating separator. The electrode assembly is hermetically sealed in a housing, which may be of various structures, such as but not limited to a coin cell, a pouch cell, or a can cell, and contains a nonaqueous, ionically conductive electrolyte operatively associated with the anode and the cathode. The electrolyte is comprised of an inorganic salt dissolved in a nonaqueous solvent and more preferably an alkali metal salt dissolved in a mixture of low viscosity solvents including organic esters, ethers and dialkyl carbonates and high conductivity solvents including cyclic carbonates, cyclic esters and cyclic amides. A non-limiting example of an electrolyte may include a lithium hexafluorophosphate (LiPF$_6$) or lithium bis(fluorosulfonyl)imide (LiFSi) salt in an organic solvent comprising one of: ethylene carbonate (EC), diethyl carbonate (DEC), dimethyl carbonate (DMC), fluoroethylene carbonate (FEC) or combinations thereof. Additional solvents useful with the embodiment of the present invention include dialkyl carbonates such as tetrahydrofuran (THF), methyl acetate (MA), diglyme, triglyme, tetragylme, 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, dipropyl carbonate, and combinations thereof. High permittivity solvents that may also be useful include cyclic carbonates, cyclic esters and cyclic amides such as propylene carbonate (PC), butylene carbonate, acetonitrile, dimethyl sulfoxide, dimethyl formamide, dimethyl acetamide, gamma-valerolactone, gamma-butyrolactone (GBL), N-methyl-2-pyrrolidone (NMP), and combinations thereof. The electrolyte serves as a medium for migration of lithium ions between the anode and the cathode during electrochemical reactions of the cell, particularly during discharge and re-charge of the cell. The electrochemical cell may also have positive and negative terminal and/or contact structures.

In various embodiments described above, the metalloid or metal oxide material is selected from the group consisting of silicon (Si), germanium (Ge), tin (Sn), lead (Pb), lithium (Li), antimony (Sb), bismuth (Bi), zinc (Zn), aluminum (Al), silver (Ag), gallium (Ga), magnesium (Mg), carbon (C), and cadmium (Cd); alloys thereof, intermetallic compounds thereof, oxides thereof, or any combination thereof.

Figure 3:
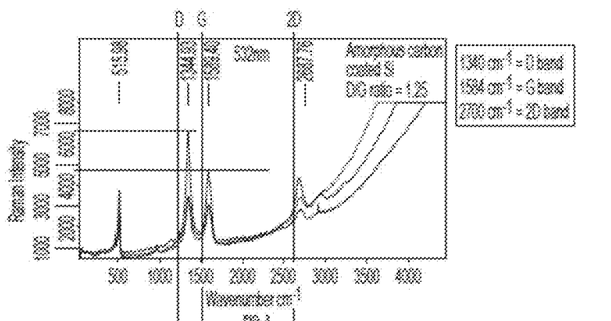
FIG. 3 illustrates the Raman spectrum of an electrode active material comprising $SiO_x$ primary particles coated with an amorphous carbon.
Figure 5:
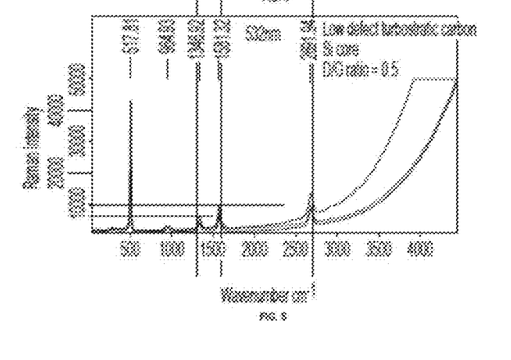
FIG. 5 illustrates the Raman spectrum of an electrode active material comprising $SiO_x$ primary particles encapsulated by a low-defect turbostratic carbon.

FIGS. 3-5 illustrate Raman spectra for active material mixtures comprising SiO$_x$ primary particles encapsulated by or coated with a carbon material. FIG. 3 is the Raman spectra for an active material mixture comprising SiO$_x$ primary particles coated with an amorphous carbon material. FIG. 4 is the Raman spectra for an active material mixture comprising SiO$_x$ primary particles encapsulated by rGO. FIG. 5 is the Raman spectra for an active material mixture comprising SiO$_x$ primary particles encapsulated by a low-defect turbostratic carbon. Each spectra is different because of varying layer thickness (size, shape and position of 2D peak around wavelength 2700 cm$^{-1}$) and disorder (size of D peak around wavelength 1340 cm$^{-1}$).

Raman analysis sample preparation involved taking small aliquots of powders such as active material powders, composite material powders, carbon material powder, and placing these powders individually into a clean glass vial. The sample powder is rinsed with methanol. The powder/methanol solutions are then vortexed briefly and sonicated for approximately 10 minutes. The suspension is then transferred to a microscope slide with a micropipette. The slides are then allowed to air dry completely before conducting the analysis.

The Raman spectroscopy analysis of the present application is conducted using confocal Raman spectroscopy on a Bruker Senterra Raman System under the following test conditions: 532 nm laser, 0.02 mW, 50X objective lens, 90 second integration time, 3 co-additions (3 Raman spectroscopy sample runs) using a 50×1000 μm aperture and a 9-18 cm$^{-1}$ resolution. As a point of reference, the D band is not active in the Raman scattering of perfect crystals. The D band becomes Raman active in defective graphitic materials due to defect-induced double resonance Raman scattering processes involving the π-π electron transitions. The intensity of the D band relative to the G band increases with the amount of disorder. The intensity I$_D$/I$_G$ ratio can thereby be used to characterize a graphene material.

The D and G bands of the amorphous carbon shown in FIG. 3 are both of higher intensity than either the reduced graphene oxide (rGO) D and G bands of FIG. 4 or the turbostratic carbon D and G bands of FIG. 5. The amorphous carbon also exhibits a substantially higher I$_D$/I$_G$ ratio (1.25) than do rGO and turbostratic carbon. The suppressed intensity of the amorphous carbon G band compared to that of its D band reflects the lack of crystallinity (also known as its graphitic nature) within its carbon structure. The D peak intensity being higher than the G peak intensity is caused by the high amount of defects in the amorphous carbon network. Hence, the amorphous carbon spectra exhibits low crystallinity and a much higher degree of disorder in its graphitic network compared with more crystalline carbons, such as graphene, graphene oxide, and rGO. Moreover, the higher intensity of the rGO D peak compared with its G peak, and its higher I$_D$/I$_G$ ratio (almost 2—) compared to the turbostratic carbon D and G peak intensities and I$_D$/I$_G$ ratio indicates the rGO to have more defects than the turbostratic carbon of the present application.

| The Table below provides the detail for the Raman spectra of FIGS. 3 through 5. | | | | | |
|---|---|---|---|---|---|
| | D | G | 2D | $I_d/I_g$ | $I_{2D}/I_g$ |
| rGO | | | | | |
| Cm$^{-1}$ | 1346.98 | 1597.82 | — | | — |
| Intensity | 9115.5 | 10033.3 | — | .91 | |
| Low Defect Turbostratic Carbon | | | | | |
| Cm$^{-1}$ | 1346.92 | 1581.32 | 2691.9 | | |
| Intensity | 2915.3 | 5849.98 | 6009.4 | 0.5 | 1.03 |
| Amorphous Carbon | | | | | |
| Cm$^{-1}$ | 1344.93 | 1589.40 | 2695.4 | | |
| Intensity | 6194.8 | 4908.2 | 5238.5 | 1.25 | 1.07 |

Careful inspection of these spectra show that when disorder increases, the D band broadens and the relative intensity of the band changes. For the amorphous carbon coated sample, the high intensity (6194.8) and broad D peak indicates a high amount of defects. The G peak being lower in intensity (4908.2) then the D peak (6194.8) indicates a lack of crystallinity. The D peak intensity (9115.5) and G peak intensity (10033.3) of the rGO encapsulated sample are fairly alike. Noticeable, however, is that the D peak intensity (9115.5) of the rGO sample is substantially higher than the D peak intensity (2915.3) of the turbostratic carbon sample indicating that the rGO sample has substantially higher defect density than does the turbostratic carbon sample. Also noticeable is that the G band for the amorphous carbon and the rGO samples are shifted to the right of wavelength 1584 cm$^{-1}$ to wavelength 1589.4 cm$^{-1}$ and 1597.82 cm$^{-1}$ respectively, whereas the G band for the turbostratic carbon sample lies slightly to the left of wavelength of 1584 cm$^{-1}$ at 1581.32 cm$^{-1}$. Of significance is that, unlike the amorphous carbon and the rGO samples, the turbostratic carbon (in this case, graphene sample) does not display much, if any, shift in position, reflecting low-defects therein, thus, the turbostratic carbon sample most nearly resembles an almost 'perfect' turbostratic carbon material.

Figure 6A:
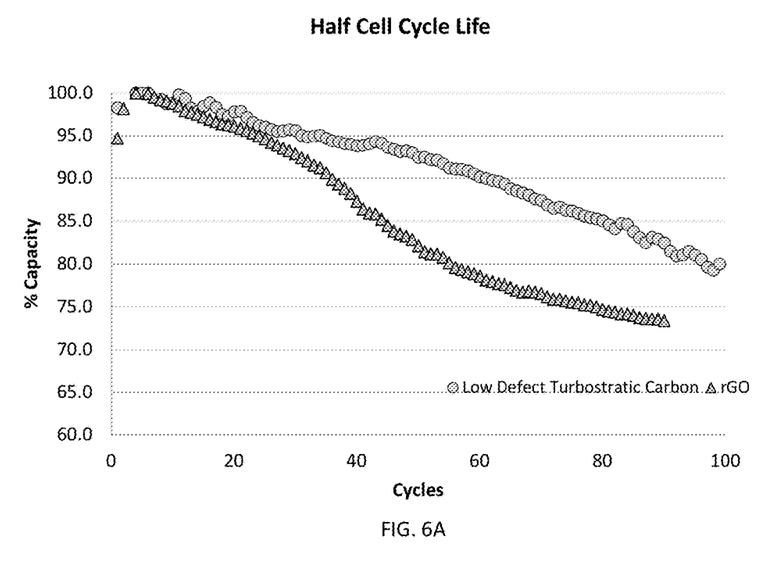
FIG. 6A is a graph showing the cycle life for exemplary and comparative half-cells.
Figure 6B:
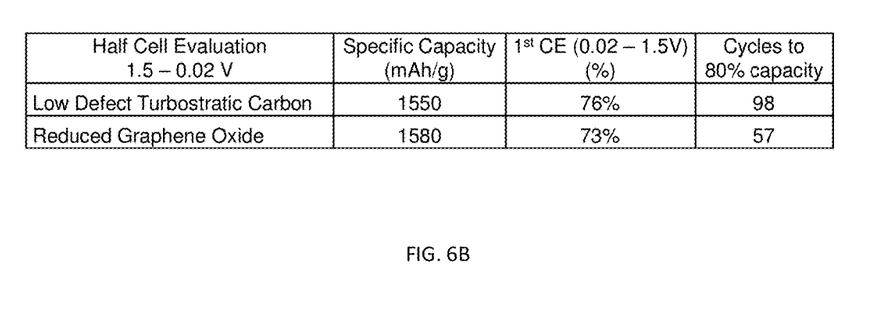
FIG. 6B is a table comparing specific capacity, first coulombic efficiency (CE), and number of cycles to 80% capacity of the exemplary and comparative half-cells of FIG. 6A, according to various embodiments of the present disclosure.

FIG. 6A is a graph comparing cycle life for exemplary half-cells including anodes including the exemplary composite particles comprising $SiO_x$ primary particles, wherein x is about 0.6, encapsulated by low-defect turbostratic carbon, and comparative half-cells including anodes including anodes comprising comparative composite particles comprising $SiO_x$ primary particles encapsulated by rGO. FIG. 6B is a chart comparing the specific capacity, first coulombic efficiency (CE), and percent capacity retained to 80% capacity for the exemplary and comparative half-cells.

Referring to FIGS. 6A and 6B, the exemplary and comparative composite particles had a $SiO_x$:carbon ratio of about 80:20. The anodes were formed by coating the respective anode material suspensions onto substrates. The respective electrode compositions included an active material: conductive additive: LiPAA binder ratio of 75:5:20. Electrodes were punched and calendered to 1.1 g/cc pressed density and built into the electrochemical test cells using either a lithium or NMC 523 counter electrode, a polypropylene separator, and a 1.0M LiPF6 EC:DEC (3:7) electrolyte with 20% FEC additive. The table of FIG. 6B shows that the exemplary half-cell including the low-defect turbostratic carbon anode material had a first coulombic efficiency 3% higher than the comparative half-cell including the comparative anode material including rGO, demonstrating less irreversible loss of lithium upon formation. Moreover, exemplary half-cell retained 98% of its capacity when cycled to 80% of its designed capacity, whereas the comparative half-cell retained only 57% of its capacity when cycled to 80% of its designed capacity. The exemplary half-cell thereby exhibited about 42% more capacity retention as compared to the comparative half-cell, demonstrating the positive impact that the low-defect turbostratic carbon material has on cycling stability.

Figure 7:
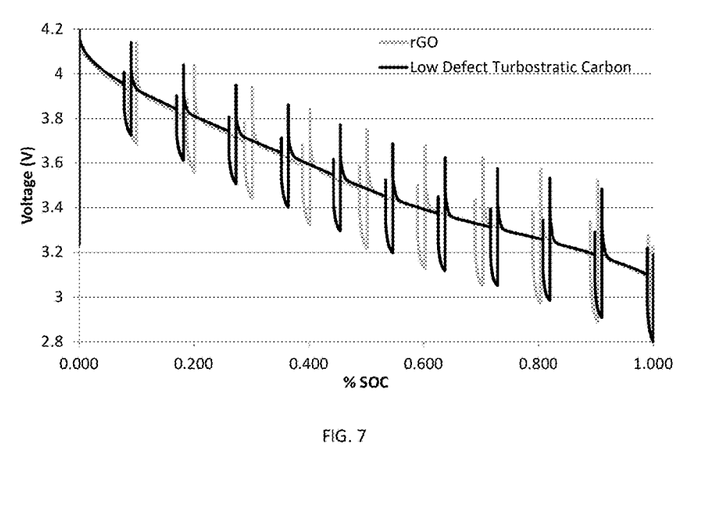
FIG. 7 is a graph showing a voltage polarization comparison of exemplary and comparative full cells, according to various embodiments of the present disclosure.
Figure 8:
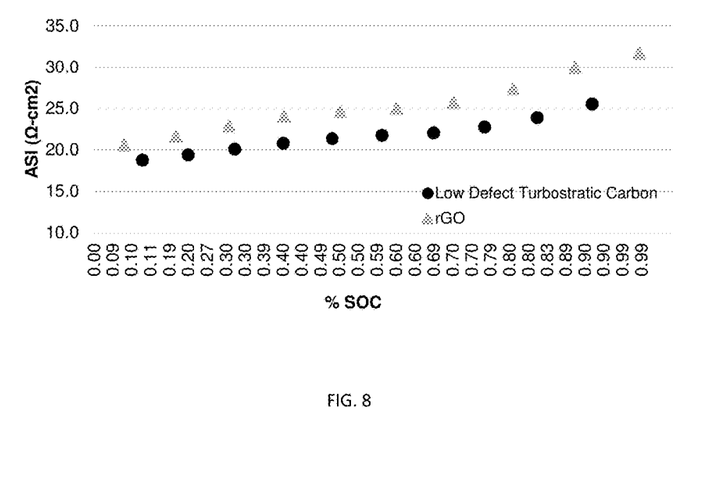
FIG. 8 is a graph showing area specific impedance (ASI) plots calculated using voltage response curves from FIG. 7 at various states of charge (SOC) of exemplary and comparative full cells.
Figure 9:
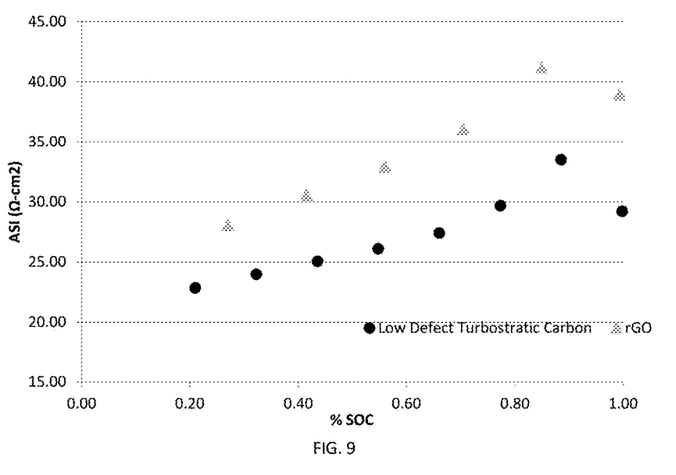
FIG. 9 is a graph showing ASI data calculated using voltage response curves FIG. 7 after 30 cycles of electrochemical testing of exemplary and comparative full cells.

FIGS. 7-9 are graphs respectively showing a high-rate capability comparison of the voltage polarization, area specific impedance (ASI) plots, and data, of exemplary and comparative full cells. The ASI in FIGS. 8 and 9 was calculated using a standardized hybrid pulse power characterization (HPPC) technique developed by the U.S. Council of Automotive Research for the development of battery technologies for electric vehicles. The measured value of ASI is a complex combination of resistances within a battery resulting from the physical processes occurring at different length and time scales. A measured value ASI, therefore, is a function of several factors, including: state of charge (SOC), pulse length, current density, C-rate, particle size, lithium diffusion length and specific medium. The combination of these factors is measured through a voltage response (polarization) to a charge or discharge current pulse as defined by the equation below:

$$\frac{V_{t0} - V_{t1}}{I_{t1} - I_{t0}} = ASI$$

where V=measured voltage of the cell
I=applied current
t0=time immediately prior to application of pulse current, and
t1=time immediately prior to termination of applied pulse current.

The exemplary and comparative electrochemical full cells were constructed keeping all components and raw materials constant except for the comparative cells including the exemplary anode material including turbostratic carbon and the comparative cells including the comparative anode material including rGO. FIG. 8 shows that the results of the HPPC testing conducted for FIG. 7, which indicate that the ASI of the exemplary cell was lower at all SOC than the ASI of the comparative cell, at the same SOC. For FIG. 8, ASI is calculated using voltage response curves from FIG. 7 at various SOC. This effect is attributed to a reduced resistance contribution of the turbostratic carbon additive to the overall cell polarization, due to its lower defect ratio within the turbostratic carbon lattice. This trend also continues as the test cells were cycled to 100% of discharge.

FIG. 9 shows that after 30 cycles of full cell cycling between 4.2 V-2.8 V using a C/2 constant current constant voltage (CCCV) charge protocol and a 2C discharge protocol, the ASI of the comparative cell increased by a greater amount than the ASI of the exemplary cell. For FIG. 9, ASI is calculated using voltage response curves from FIG. 7, after 30 cycles of electrochemical testing. This increase in ASI indicates that the comparative cell had lower cycling stability and greater resistance buildup upon repeated cycling, as compared to the exemplary cell. Moreover, the cycling stability of the comparative cell decreases and the resistance buildup thereof increased, as the number of cycles increased.

Figure 10:
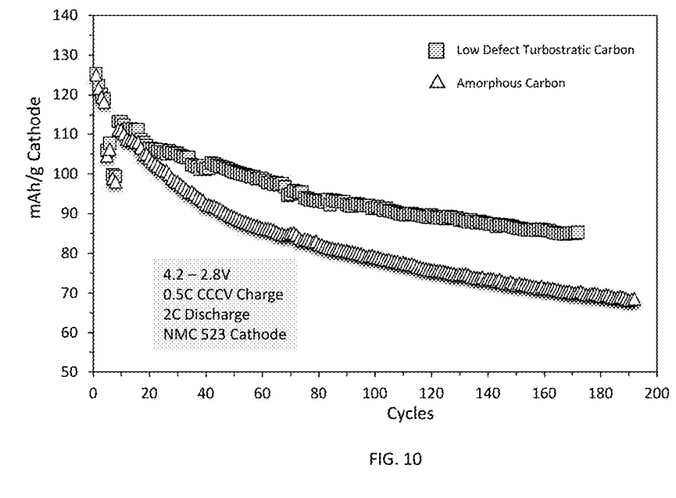
FIG. 10 is a graph showing the cycle life for exemplary and comparative full-cells.
Figure 11:
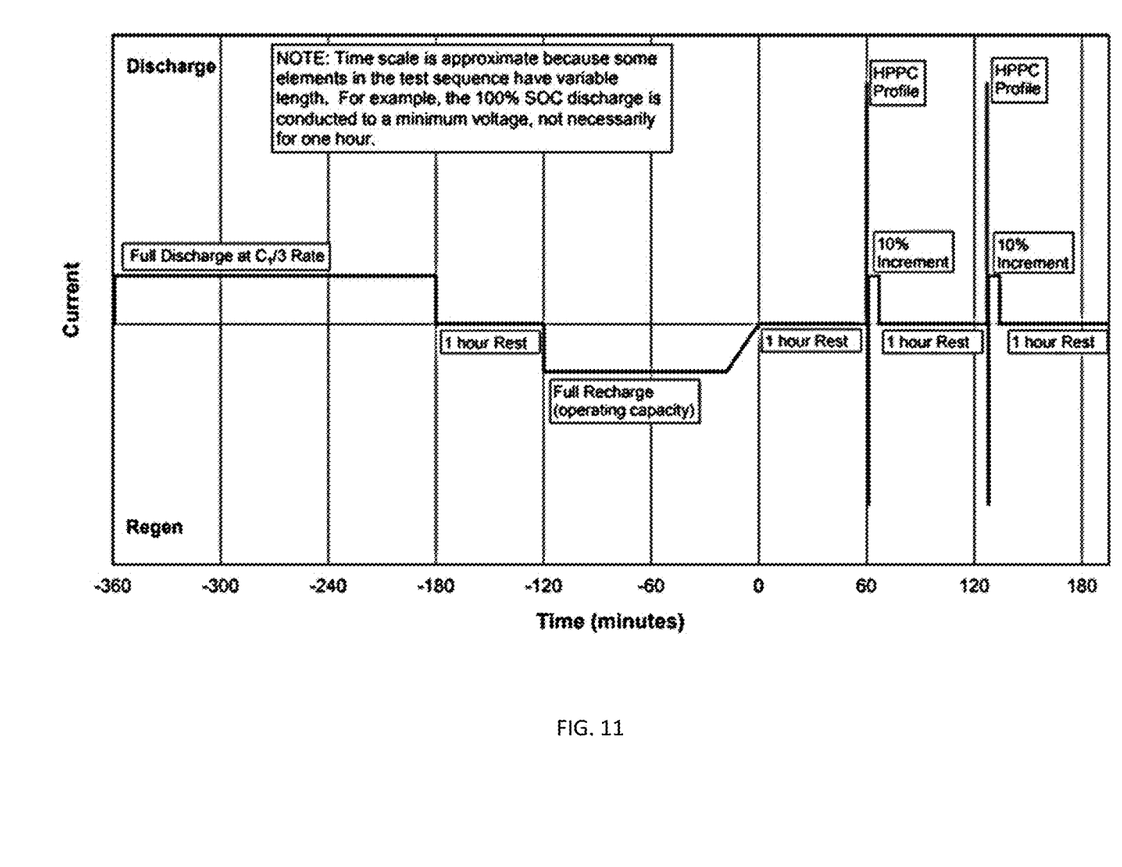
FIG. 11 is a graph showing an exemplary hybrid pulse power characterization test regimen.

FIG. 10 is a graph showing the cycle life for exemplary and comparative full cells, according to various embodiments of the present disclosure. Referring to FIG. 11, the exemplary and comparative full cells were 2032 coin-type cells that each included: an NMC cathode; a polypropylene separator; an electrolyte including 1.0M $LiPF_6$,in EC:DEC:DMC (1:1:1) and 20% FEC; and an anode comprising 60% $SiO_x$, 20% graphite, 5% conductive additive, and 15% PAA binder. The SiO of the exemplary anode was wrapped in turbostratic carbon, and the anode of the comparative cell was coated with amorphous carbon deposited by CVD.

As shown in FIG. 10, the exemplary cell showed better initial capacity at a 2C discharge rate than the comparative cell. The exemplary cell also showed improved cycling stability, as compared to the comparative cell.

FIG. 11 is chart showing current application during the HPPC test regimen. The sequence of rest periods, pulse profiles, and discharge segments is illustrated in FIG. 11. The objective of this test is to determine the discharge-pulse (5 C rate) and the charge-pulse (3.75 C) power capabilities at each 10% capacity increment relative to the maximum operating capacity for a given cell. Between each pair of discharge and regeneration (charge) pulses, the device is discharged to the next 10% increment based on operating capacity using the C/3 rate. The HPPC test begins with a charged device up to Vmax using the manufacturer recommended procedure followed by a default rest period (often 1 hour). The test is generally programmed so that 10% of the operating capacity is removed in each test segment, including that removed by the pulse profile itself. An HPPC profile is performed immediately followed by a discharge to the next 10% increment of the rated capacity at the C/3 and a default rest. This sequence is repeated until the final profile at or near 90% of the operating capacity is removed. The test terminates with a discharge of the device at the C/3 rate to Vmin0 and a final default rest.

Figure 12:
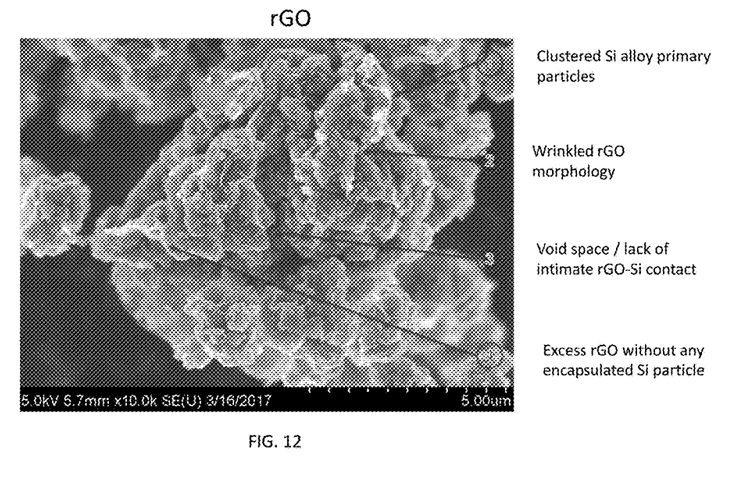
FIG. 12 is a scanning electron microscope (SEM) image of a composite particle comprising $SiO_x$ primary particles encapsulated by reduced graphene oxide.

FIG. 12 is a scanning electron microscope (SEM) image of a comparative composite particle comprising $SiO_x$ primary particles and aggregates of wrinkled rGO sheets at an 80:20 $SiO_x$:rGO wt % ratio. Visible are small grape-like clusters of $SiO_x$ particles (area 1) randomly distributed about the wrinkled rGO sheets (area 2). The composite particle shown is larger than 5 μm as derived from the image micron marker and exhibits morphological variations that can, additionally, unfavorably affect electrochemical properties of the powder comprising these particles. Various $SiO_x$ clusters encapsulated by the wrinkles of the rGO sheets are shown in the SEM image. Also shown, and of particular significance to the resultant electrochemical properties of the powder, is a particle morphology that exhibits numerous void spaces (area 3 is an example) having poor contact (i.e., lacks intimate contact) between the wrinkled rGO sheets and the $SiO_x$ primary particles. Additionally, the SEM image shows that the composite particle also exhibits an excessive amount of wrinkled rGO sheets absent $SiO_x$ clusters (area 4 is an example). This variation in the composite particle morphology is a result of choosing a large lateral rGO sheet size respective to the average $SiO_x$ primary particle used, thereby allowing excess rGO to fold upon itself, resulting in a composite particle with either excess or deficient rGO coverage of the $SiO_x$ primary particles. As previously disclosed, the $SiO_x$ primary particles may be submicron (less than 1 μm) or may have an average particle size ranging from about 1 μm to about 15 μm. Thus, these morphological variations that cause a lack of intimate and distributed contact with the $SiO_x$ particles, in addition to the higher defect density of said rGO (i.e., an $I_D/I_G$ ratio>0.8 as derived by Raman spectroscopy), further contribute to the reduced effectiveness of the rGO in providing conductivity to the $SiO_x$ primary particles, when compared to primary particles encapsulated with the low-defect turbostratic carbon of the present application.

Figure 13:
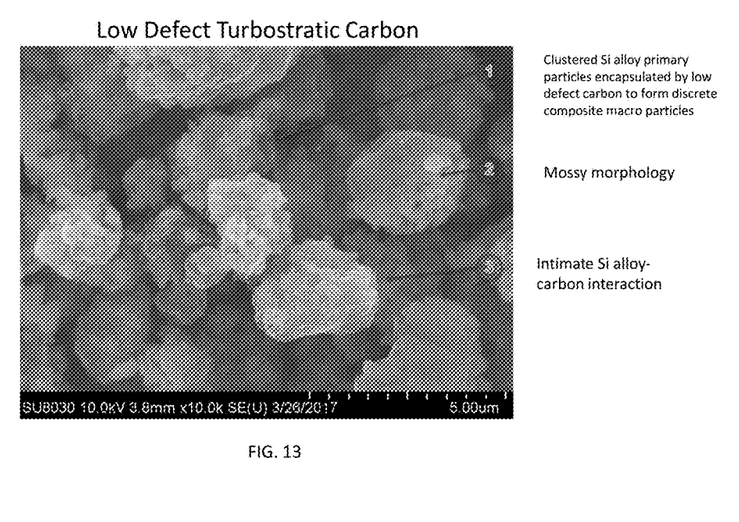
FIG. 13 is a scanning electron microscope (SEM) image of composite particles comprising $SiO_x$ primary particles encapsulated by a low-defect turbostratic carbon.

FIG. 13 is an SEM image of exemplary composite particles comprising $SiO_x$ primary particles encapsulated by low-defect turbostratic carbon sheets at an 80:20 $SiO_x$:carbon wt % ratio. Visible are clustered Si alloy primary particles encapsulated by and in intimate contact with the low-defect carbo sheets that form discrete nearly spherical composite particles (area 1 is an example of one of these particles). The composite particles shown have a particle size of less than 5 μm as derived from the image micron marker. These composite particles have a defined structural fingerprint, displaying an $I_D/I_G$ ratio of greater than zero and less than or equal to about 1.1 and an $I_{2D}/I_G$ ratio of from about 0.4 to about 2.0 as determined by Raman spectroscopy conducted at 532 nm laser excitation wavelength, wherein an $I_D/I_G$ ratio≤1.1 indicates low-defect and an $I_{2D}/I_G$ ratio of about 0.4 or more indicates low sheet count of about 10 sheets or less. Additionally, a 2D band exhibiting a single peak profile that is symmetric about its peak and an intensity that is higher than that of its G band indicates turbostraticity and lack of AB stacking between the sheets. The low sheet count and the lack of AB stacking between the sheets of the low-defect turbostratic carbon material create a mossy mosaic-like structure on the surface of these composite particles (area 2 is an example). It is the low sheet count and lack of AB stacking order that permits flexibility of the composite particles such that create and sustain intimate contact between the $SiO_x$ primary particles and the encapsulating low-defect turbostratic carbon material. The intimate contact between the primary particles and the carbon is observable in the SEM image. Noticeable is that the low-defect turbostratic carbon material is distinctive in that it lacks the excess folding or wrinkling present in the rGO particle.

Various electrochemical tests were performed showing that the low-defect turbostratic carbon exhibited better performance than the reduced graphene oxide. The wrapping, mixing, coating, or encapsulating of silicon alloy actives materials with low-defect turbostratic carbon additives provides a flexible and conductive matrix to ensure individual particles remain in electrical contact after significant volume changes associated with lithiation/delithiation of the active material. Electrochemical performance of the silicon alloy anode material with respect to cycling stability and high rate discharge can be maximized by optimizing the defect characteristics of the carbon additive and properly incorporating it onto the surface of the silicon alloy active particle. Specifically, low-defect density is necessary for enhancing the inherent conductivity of the carbon material and intimate, even contact with the $SiO_x$ active material ensures that this enhanced conductivity participates in the charge transfer process upon lithium insertion and extraction.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of making turbostratic carbon, comprising:
forming a suspension by suspending the turbostratic carbon in a polar liquid solvent;
aerosolizing the suspension; and
drying the aerosolized suspension to force the suspended turbostratic carbon into intimate contact to form a hollow envelope,
wherein the turbostratic carbon comprises:
a D band having a peak intensity ($I_D$) at wave number between 1330 $cm^{-1}$ and 1360 $cm^{-1}$;
a G band having a peak intensity ($I_G$); and
a 2D band having a peak intensity ($I_{2D}$) at wave number between 2650 $cm^{-1}$ and 2750 $cm^{-1}$.

2. The method of claim 1, wherein:
a ratio of $I_D/I_G$ ranges from greater than zero to about 1.1; and
a ratio of $I_{2D}/I_G$ ranges from about 0.4 to about 2.

3. The method of claim 2, wherein:
$I_G$ is at a wave number between about 1530 $cm^{-1}$ and about 1598 $cm^{-1}$;
the ratio of $I_D/I_G$ ranges from greater than zero to about 0.8; and
the ratio of $I_{2D}/I_G$ ranges from about 0.5 to about 2.

4. The method of claim 3, wherein:
the ratio of $I_D/I_G$ ranges from 0.3 to 0.7; and
the ratio of $I_{2D}/I_G$ ranges from 0.8 to 1.2.

5. The method of claim 2, wherein:
$I_D$ is at wave number of about 1340 $cm^{-1}$;
$I_G$ is at wave number ranging from 1580 $cm^{-1}$ to about 1584 $cm^{-1}$; and
$I_{2D}$ is at a wave number of about 2700 $cm^{-1}$.

6. The method of claim 1, wherein:
the forming a suspension further comprises suspending an electrochemically active material in the polar liquid solvent; and
the drying the aerosolized suspension further comprises encapsulating the electrochemically active material in the envelope to form a composite particle.

7. The method of claim 6, wherein the electrochemically active material is selected from the group consisting of silicon, silicon oxide, Sn, Ge, Sb, $TiO_2$, ZnO, $SnO_2$, $Co_3O_4$, $Fe_2O_3$, $MnO_2$, $Mn_3O_4$, MnO, $Fe_3O_4$, $MoO_2$, $MoO_3$, CuO, $Cu_2O$, $CeO_2$, $RuO_2$, NiO, carbon, a bimetallic material, a multi-metallic material, an oxide material, a sulfide material, and combinations thereof.

8. The method of claim 6, wherein the electrochemically active material comprises $SiO_x$, wherein x ranges from about 0.1 to about 1.3.

9. The method of claim 6, wherein the electrochemically active material comprises at least 50 weight percent of a total weight of the composite particles.

10. The method of claim 6, wherein:
the composite particle has a particle size ranging from about 1.0 μm to about 15.0 μm; and
the active material has a particle size ranging from about 50 nm to about 10 μm.

11. The method of claim 6, further comprising mixing the composite particle and a binder to form an electrode.

12. The method of claim 11, wherein the binder comprises polytetrafluoroethylene (PTFE), polyvinylidene fluoride (PVDF), poly(acrylic) acid, polyethylenetetrafluoroethylene (ETFE), polyamides, and polyimides, polyethylene (UHMW), carboxy methyl cellulose (CMC), styrene butadiene rubber (SBR), polyacrylic acid (PAA), lithium polyacrylic acid (LiPAA), or mixtures thereof.

13. The method of claim 11, wherein the electrode further comprises a conductive additive selected from the group consisting of carbon black, carbon nanotubes, an electrically conductive polymer, graphite, a metallic powder, nickel, aluminum, titanium, stainless steel, and any combination thereof.

14. The method of claim 11, further comprising placing the electrode into a lithium secondary battery.

15. The method of claim 6, wherein:
the envelope comprises a crumpled ball structure having at least one of creases, ripples, folds, wrinkles or ridges; and
the envelope comprises layers of the turbostratic carbon that at least partially overlap one another on a surface of each active material particle.

16. A method of making an active material, comprising:
forming a suspension by suspending a turbostratic carbon and an electrochemically active material in a polar liquid solvent;
aerosolizing the suspension; and
drying the aerosolized suspension to form composite particles comprising particles of the active material disposed within envelopes formed of the turbostratic carbon,
wherein the turbostratic carbon comprises:
a D band having a peak intensity ($I_D$) at wave number between 1330 $cm^{-1}$ and 1360 $cm^{-1}$;
a G band having a peak intensity ($I_G$); and
a 2D band having a peak intensity ($I_{2D}$) at wave number between 2650 $cm^{-1}$ and 2750 $cm^{-1}$.

17. The method of claim 16, wherein each of the envelopes comprises a crumpled ball structure having at least one of creases, ripples, folds, wrinkles or ridges.

18. The method of claim 16, wherein the envelopes comprise layers of the turbostratic carbon that at least partially overlap one another on a surface of each active material particle.

19. The method of claim 16, wherein:
a ratio of $I_D/I_G$ ranges from 0.3 to 0.7; and
a ratio of $I_{2D}/I_G$ ranges from 0.8 to 1.2.

20. The method of claim 16, wherein the electrochemically active material comprises $SiO_x$, wherein x ranges from about 0.1 to about 1.3.

* * * * *